United States Patent
Hua et al.

(10) Patent No.: US 10,932,097 B2
(45) Date of Patent: Feb. 23, 2021

(54) METHOD AND SYSTEM OF ROUTING SELECTION FOR SMS OVER NAS

(71) Applicant: Verizon Patent and Licensing Inc., Arlington, VA (US)

(72) Inventors: Suzann Hua, Walnut Creek, CA (US); Priscilla Lau, Concord, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 54 days.

(21) Appl. No.: 16/229,730

(22) Filed: Dec. 21, 2018

(65) Prior Publication Data

US 2020/0204962 A1    Jun. 25, 2020

(51) Int. Cl.
| | |
|---|---|
| *H04W 4/14* | (2009.01) |
| *H04W 88/18* | (2009.01) |
| *H04W 8/04* | (2009.01) |
| *H04W 48/18* | (2009.01) |

(52) U.S. Cl.
CPC ............ *H04W 4/14* (2013.01); *H04W 8/04* (2013.01); *H04W 48/18* (2013.01); *H04W 88/184* (2013.01)

(58) Field of Classification Search
CPC ......... H04W 4/14; H04W 8/04; H04W 48/18; H04W 48/20; H04W 88/184; H04W 8/02; H04W 4/70
See application file for complete search history.

(56) References Cited

U.S. PATENT DOCUMENTS

| | | | |
|---|---|---|---|
| 10,212,690 B1 * | 2/2019 | Lau | H04W 40/005 |
| 10,470,042 B2 * | 11/2019 | Nair | H04W 8/02 |
| 10,506,506 B2 * | 12/2019 | Qiao | H04W 8/08 |
| 10,574,457 B2 * | 2/2020 | Jerichow | H04L 9/3073 |

(Continued)

FOREIGN PATENT DOCUMENTS

WO    WO-2018231029 A1 *    12/2018    ............ H04W 80/10

OTHER PUBLICATIONS

ETSI TS 129518 v15.0.0, 5G; 5G System; Access and Mobility Management Services State 3 (3GPP TS 29.518 version 15.0.0 Release 15, p. 104 (Year: 2018).*

*Primary Examiner* — Ayaz R Sheikh
*Assistant Examiner* — Louis Samara (57) ABSTRACT

Systems and methods described herein provide routing determinations for MT-SMS-over-NAS in core networks that support 5G and legacy systems. A network device stores routing priority data for multiple short message service (SMS) delivery methods in the core network. The network device receives, from a first network element, a delivery request for a mobile-terminated (MT) SMS message directed to an end device and sends, in response, a query to a second network element. The query requests a short message service function (SMSF) address for an SMSF in the core network with which the end device is registered. The network device receives a response to the query and selects, based on the response and the stored routing priority data, an SMS delivery method for the MT SMS message. The network device sends, to a third network element, routing instructions for the MT SMS message based on the selected SMS delivery method.

20 Claims, 7 Drawing Sheets

(56) References Cited

U.S. PATENT DOCUMENTS

| | | | |
|---|---|---|---|
| 2006/0136560 A1* | 6/2006 | Jiang | H04L 51/14 |
| | | | 709/206 |
| 2018/0227738 A1* | 8/2018 | Gupta | H04L 61/2514 |
| 2018/0255421 A1* | 9/2018 | Hua | H04W 4/70 |
| 2018/0317157 A1* | 11/2018 | Baek | H04W 40/20 |

* cited by examiner

METHOD AND SYSTEM OF ROUTING SELECTION FOR SMS OVER NAS

BACKGROUND

Fifth Generation (5G) networks may use different frequencies, different radio access technologies, and different core network functions that can provide an improved user experience over other wireless networks (e.g., Fourth Generation (4G) networks). However, the transition from such current or legacy systems to 5G networks presents a challenge for network service providers to concurrently support users of older technologies and users of the new systems.

5G networks may not be directly compatible with networks based on 4G standards. 5G networks use different RAN technology and different core network functions than those currently used for 4G networks. However, 5G-capable end devices will continue to rely on 4G connections due to the limited coverage areas of 5G networks, especially while service providers are continuing to build the 5G infrastructure.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

During the transition from 4G networks to 5G, end devices may switch between different RANs and core networks that support either 4G or 5G functionality. In a mobility context, cellular service providers need to support continuity of voice and data connections, to provide a good user experience for customers while maximizing the benefits of 5G connections. Dual connectivity solutions are employed when end devices (e.g., user equipment (UE)) can connect to different radio access technology (RAT) types simultaneously or to different frequencies in the same RAT. For example, an end device can connect simultaneously to a 5G radio access network (RAN) and an Evolved Universal Mobile Telecommunications System (UMTS) Terrestrial RAN (E-UTRAN) of a Long Term Evolution (LTE) network. In such cases, downlink and uplink packets can be transmitted over one or both of the radio access technologies.

Service providers may use different mobile-terminated (MT) short message service (SMS) delivery schemes. For example, in some instances, it may be preferable to deliver MT SMS over non-access stratum (NAS). NAS is a functional layer in some wireless telecom protocol stacks between a core network and mobile device. In other instances, carriers may prefer to deliver SMS over an IP Multimedia Subsystem (IMS, an architectural framework for delivering IP multimedia services). In order for SMS to work over NAS, NAS requires the end device to perform a combined EPS (Evolved Packet System) and IMSI (International Mobile Subscriber Identity) attachment. In contrast with SMS over NAS, SMS over IMS requires the end device to support SIP (Session Initiation Protocol) registration.

Under current network standards for 5G core networks, a short message service function (SMSF) is used to provide SMS over NAS. In contrast with 5G standards, EPS networks (e.g., such as 4G core networks) provide SMS via NAS using a SMS Center (SMSC). While the SMSC can serve the 5G core, current network standards do not provide routing determination specifications for mobile-terminated SMS over NAS. Thus, current specifications do not consider how to determine routing MT SMS over NAS via a 5G SMSF or an EPS Short Message Service Inter-Working Function (SMS-IWF) from an SMSC when the SMSC can serve both 5G and EPS.

A network function, such as an SMS gateway (SMS-GW), may support a 5G SBI (Service Based Interface) that can interwork with a 5G core unified data management (UDM) function. This SMS-GW serves as a "middle man" between the 5G core SMSF and the legacy EPS SMSC network elements, not only for the MT SMS cases but also for mobile originated (MO) SMS cases. However, the SMS-GW is not needed in most MO SMS cases, since the SMSF can obtain an end device's SMSC address from a UDM upon the end device's registration with the SMSF.

Systems and methods described herein provide routing determinations for MT-SMS-over-NAS in core networks that use both 5G and legacy systems. More particularly, the systems and methods provide for a 5G/EPS routing determination, for MT-SMS-over-NAS, by an SMS-GW. The routing determination includes use of an enhanced Sh interface between the SMS-GW and the UDM, between the SMS-GW and a home subscriber server (HSS), or between the SMS-GW and a combined UDM and HSS (referred to herein as an HSS/UDM). With this approach, the Sh interface is enhanced to support querying an SMSF address along with 5G core location data.

The systems and methods described herein may minimize the new 5G core related enhancement on SMS-GW as the existing EPS Sh (DIAMETER) interface will be used instead of the new Hypertext Transfer Protocol (HTTP) service-based interface. Thus, the required enhancement will not be disruptive. As a result, the systems and methods will help to speed up and smooth 5G MT SMS over NAS support. In addition, systems and methods described herein minimize the amount of queries to the HSS and UDM, and therefore improve efficiency for 5G or 4G MT SMS delivery. Furthermore, the systems and methods described herein do not introduce additional and unnecessary overhead for 5G support of MO SMS over NAS.

Figure 1:
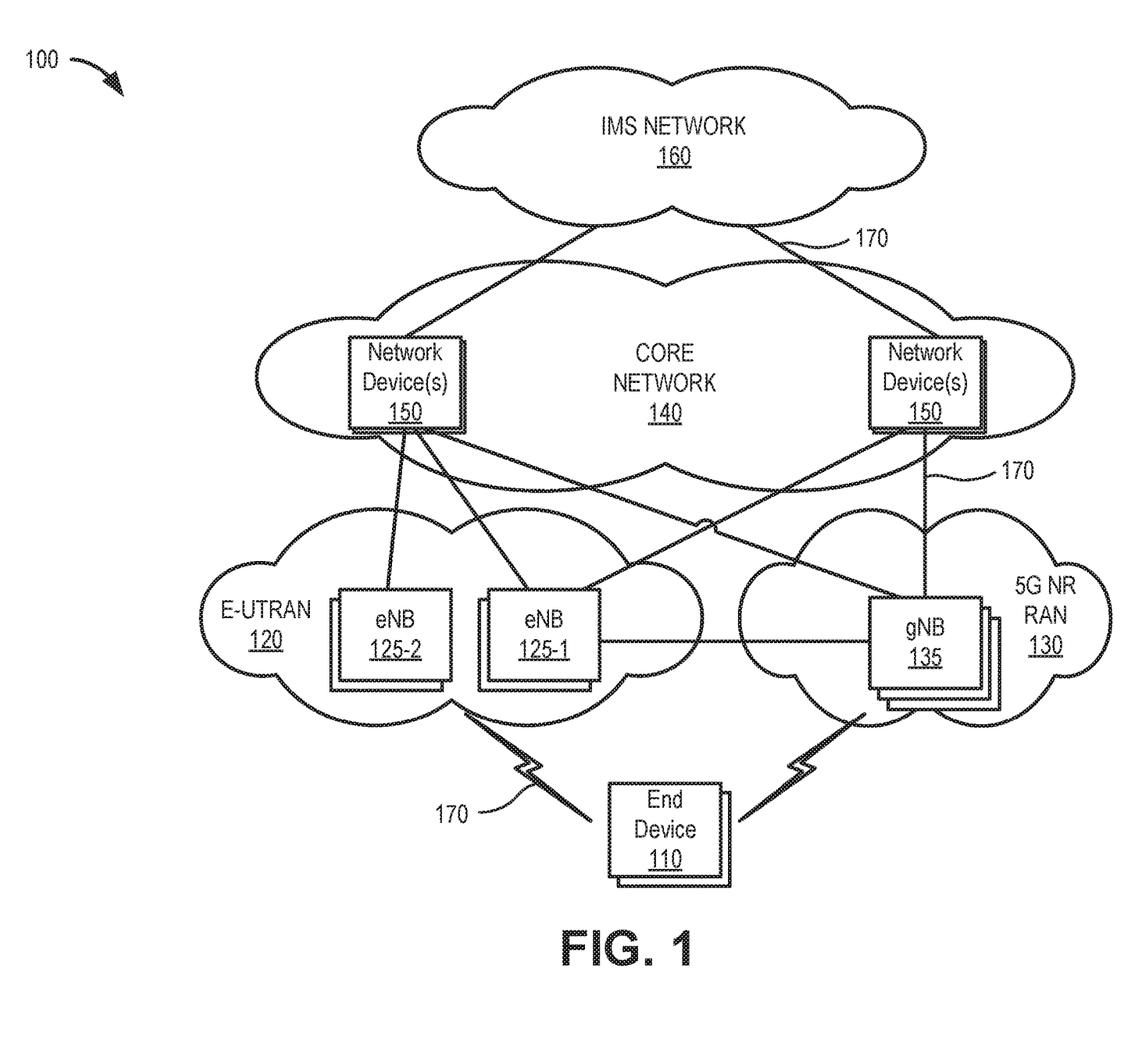
FIG. 1 is a diagram illustrating an exemplary environment in which an exemplary embodiment of a stateless network function service may be implemented.

FIG. 1 is a diagram of an exemplary network environment 100 in which the systems and methods, described herein, may be implemented. As shown in FIG. 1, environment 100 may include an end device 110, an E-UTRAN 120 including multiple eNodeBs (eNB) 125-1 and 125-2, a 5G RAN 130 including multiple next generation node gNodeBs (gNBs) 135, a core network 140 with network devices 150, and an Internet Protocol (IP) multimedia subsystem (IMS) network 160. According to other embodiments, environment 100 may include additional networks, fewer networks, and/or different types of networks than those illustrated and described herein.

The number, the type, and the arrangement of network devices, and the number of end devices, are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes links 170 between the networks and between the devices. Environment 100 may include wired, optical, and/or wireless links 170 among the devices and the networks illustrated. A communication connection via a link 170 may be direct or indirect. For example, an indirect communication connection may involve an intermediary device and/or an intermediary network not illustrated in FIG. 1. Additionally, the number and the arrangement of links illustrated in environment 100 are exemplary.

End device 110 may include any type of mobile device having multiple coverage mode capabilities, and thus the capability to communicate simultaneously with different wireless stations (e.g., eNB 125, gNB 135, etc.) using different wireless channels (e.g., one of links 170) corresponding to the different RANs (e.g., E-UTRAN 120 and 5G RAN 130). End device 110 may be a mobile device that may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, end device 110 may be implemented as a machine-type communications (MTC) device, an Internet of Things (IoT) device, a machine-to-machine (M2M) device, etc. End device 110 may also be referred to as UE device 110 or simply UE 110.

eNB 125 may include a network device that has computational and wireless communication capabilities. eNB 125 may include a transceiver system and other components having functionality that allow end device 110 to wirelessly connect to E-UTRAN 120 and core network 140. eNB 125 may interface with core network 140 via a DIAMETER Si interface, for example.

gNB 135 may include a network device and other components having functionality that allows end device 110 to wirelessly connect to 5G RAN 130 and core network 140. In one implementation, gNB 135 may interface with core network 140 via a DIAMETER Si interface. In some instances, eNB 125 and/or gNB 135 may be referred to as a "wireless station."

Core network 140 may include one or multiple networks of one or multiple types. According to an implementation, core network 140 includes a network pertaining to multiple RANs, such as E-UTRAN 120 and 5G NR RAN 130. For example, core network 140 may include the core part of an LTE network, an LTE-A network, a 5G network, a legacy network, and so forth.

Depending on the implementation, core network 140 may include various network elements that may be implemented in network devices 150. In the context of a 4G network, such network elements may include a mobility management entity (MME), a packet gateway (PGW), a serving gateway (SGW), an HSS device, an authentication, authorization, accounting (AAA) server, an SMSC, and SMS-IWF, etc. In the context of a 5G network, core network 140 may include a user plane function (UPF), an access and mobility management function (AMF), a session management function (SMF), a UDM function, an authentication server function (AUSF), a network slice selection function (NSSF), a network repository function (NRF), a policy charging function (PCF), an SMSF, and so forth. According to other exemplary implementations, core network 140 may include additional, different, and/or fewer network devices 150 than those described. In some instances, different 4G and 5G core network elements may be combined in a single network device 150. For purposes of illustration and description, network devices 150 may include various types of network devices that may be resident in core network 140, as described herein.

IMS network 160 may include a network for delivering IP multimedia services and may provide media flows between end devices 110 and external IP networks or other networks (not shown in FIG. 1). IMS network 160 may include devices and/or functions to support voice calls, data calls, and other applications for end devices.

Figure 2:
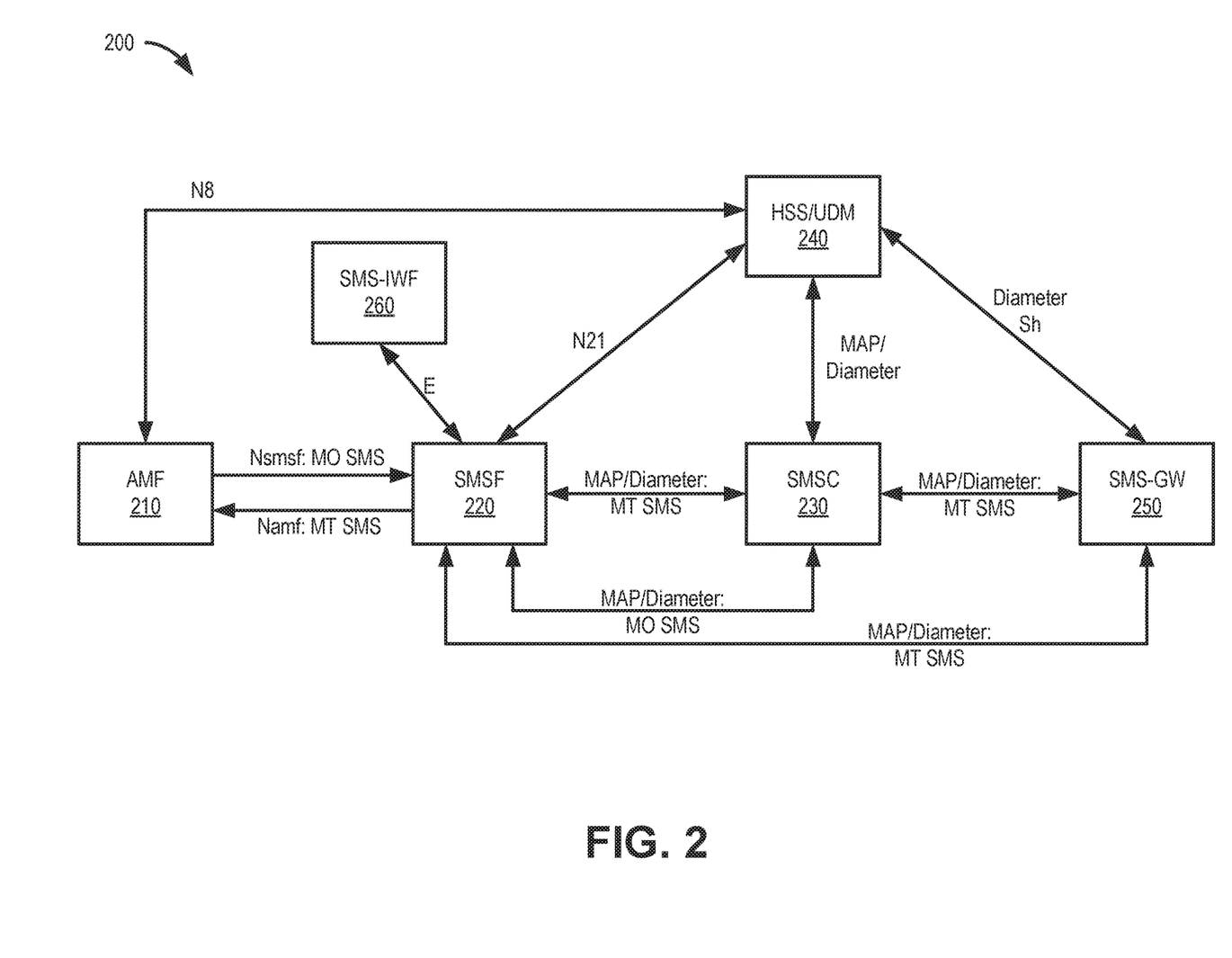
FIG. 2 is a diagram illustrating network functions and communications with a portion of the network environment of FIG. 1.

FIG. 2 is a diagram illustrating network functions and communications with a portion 200 of network environment 100. As shown in FIG. 2, network portion 200 may include an AMF 210, an SMSF 220, an SMSC 230, an HSS/UDM 240, a SMS-GW 250, and a Short Message Service Inter-Working Function (SMS-IWF) 260. Network functions shown in FIG. 2 may generally correspond to network devices 150 of FIG. 1.

AMF 210 may perform registration management, connection management, reachability management, mobility management, lawful intercepts, SMS transport between end device 110 and SMSF 220, session management messages transport between end device 110 and an SMF, access authentication and authorization, location services management, support non-3GPP access networks, and/or other types of management. AMF 220 may communicate with HSS/UDM 240 to obtain subscriber profile data via an N21 interface. AMF 210 may be accessible by SMSF 220 and other function nodes via an Namf interface.

SMSF 220 may manage short message service over NAS and implement short message protocols with the end device 110. SMSF 220 may relay mobile-originated (MO) SMS messages toward the SMSC 230 and may relay mobile terminated (MT) SMS messages toward end device 110. SMSF 220 also interacts with the AMF 210 regarding availability of end device 110 for SMS transfer. Although one SMSF 220 is shown in FIG. 2, network environment 100 may include multiple individually-addressable SMSF instances that serve different geographic regions throughout network environment 100.

SMSC 230 (also referred to as "SMSC device 230") may receive an SMS message from an originator (e.g., an application server or another end device 110) and may route or switch the SMS message to end device 110 via an MSC, an SMS-IWF, or an SMSF that supports end device 110 when end device 110 is the intended recipient of the SMS message. Moreover, SMSC 230 may receive a short message from end device 110 via another node (e.g., an SMS-IWF) and may route or switch the SMS message to an application server or another end device that is the intended recipient of the SMS message. In some implementations, SMSC 230 may be located in core network 140.

HSS/UDM 240 may combine functions of an HSS for a 4G network and a UDM for a 5G network. Thus, in one implementation, HSS/UDM 240 may be treated as a single network entity that provides information for both 4G and 5G core network functions. HSS/UDM 240 may store information associated with end devices 110 and/or information associated with users of end devices 110. For example, HSS/UDM 240 may store subscription profiles that include authentication and access authorization information. Each subscription profile may include a list of end devices 110 associated with the subscription as well as an indication of which end device 110 is authorized to connect to RAN 120/130 and to core network 140. Additionally, HSS/UDM 240 may track and store location-related information for end devices 110, such as current serving nodes for a particular end device 110. HSS/UDM 240 may communicate with AMF 210 via an N8 interface, with SMSF 220 via an N21 interface, and with SMSC 230 via a Mobile Application Part (MAP) or DIAMETER protocol interface. As described further herein, HSS/UDM 240 may communicate with SMS-GW 250 via a modified DIAMETER Sh interface that permits HSS/UDM 240 to receive requests for SMSF addresses from SMS-GW 250 and provide SMSF addresses to SMS-GW 250.

SMS-GW 250 (also referred to as "SMS-GW device 250") may route MT SMS message through optimal network function nodes according to priorities determined for the network. SMS-GW 250 may receive MT SMS messages (e.g., originating from an application server or another source via SMSC 230), and SMS-GW 250 may query HSS/UDM 240 for address data of network functions using a DIAMETER Sh user data request (UDR) message. Based on a response (e.g., a user-data-answer (UDA) message) from HSS/UDM 240, SMS-GW 250 may apply routing priorities for the particular MT SMS over NAS. SMS-GW 250 may route the MT SMS message to SMSC 230 with instructions for forwarding through a preferred delivery method (e.g., via IMS, via 5G NAS, or via EPS NAS).

SMS-IWF 260 may interface with SMSC 230 to receive and forward SMS messages in an EPS (e.g., 4G) network. For example, each SMS-IWF 260 may be assigned a subset of the end devices 110 associated with a particular MME. In one implementation, SMS-IWF 260 may perform some functions similar to or equivalent to a visitor location register (VLR). SMS-IWF 260 may receive an MT SMS message from SMSC 230 and may provide the SMS message to an MME for delivery to end device 110. Moreover, SMS-IWF 260 may receive an MO SMS message from the MME and may provide the SMS message to SMSC 230. SMS-IWF 260 may communicate with SMSF 220 via an E interface (e.g., SS7 MAP-E).

Figure 3:
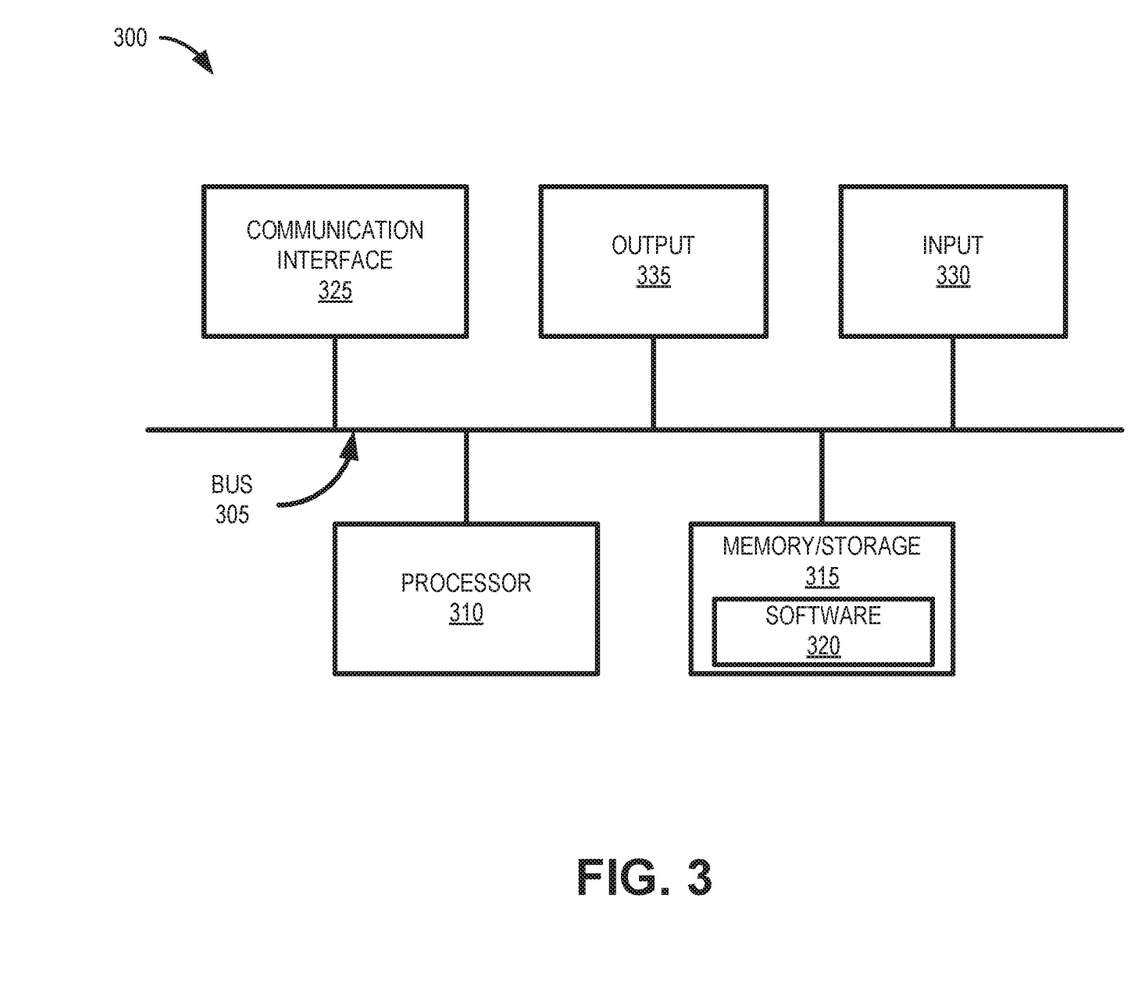
FIG. 3 is a diagram illustrating exemplary components of a device that may correspond to one or more of the devices illustrated and described herein.

FIG. 3 is a diagram illustrating example components of a device 300 according to an implementation described herein. End device 110, eNB 125, gNB 135, network device 150, AMF 210, SMSF 220, SMSC 230, HSS/UDM 240, and SMS-GW 250 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, SMS-GW 250 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
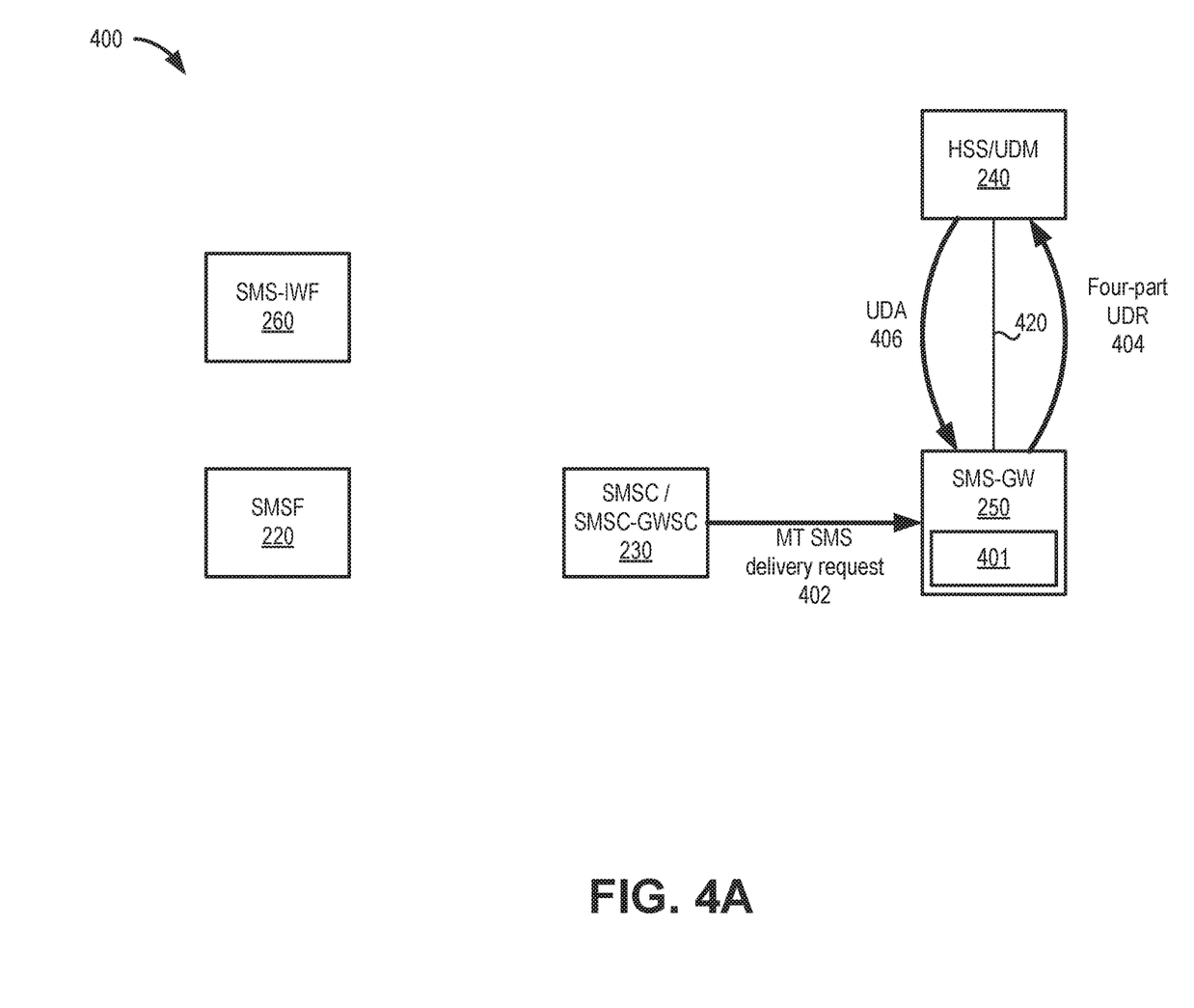
FIGS. 4A and 4B are diagrams illustrating an exemplary process of Short Messaging Service (SMS) routing selection in a portion of the network environment of FIG. 1, according to an implementation.
Figure 4B:
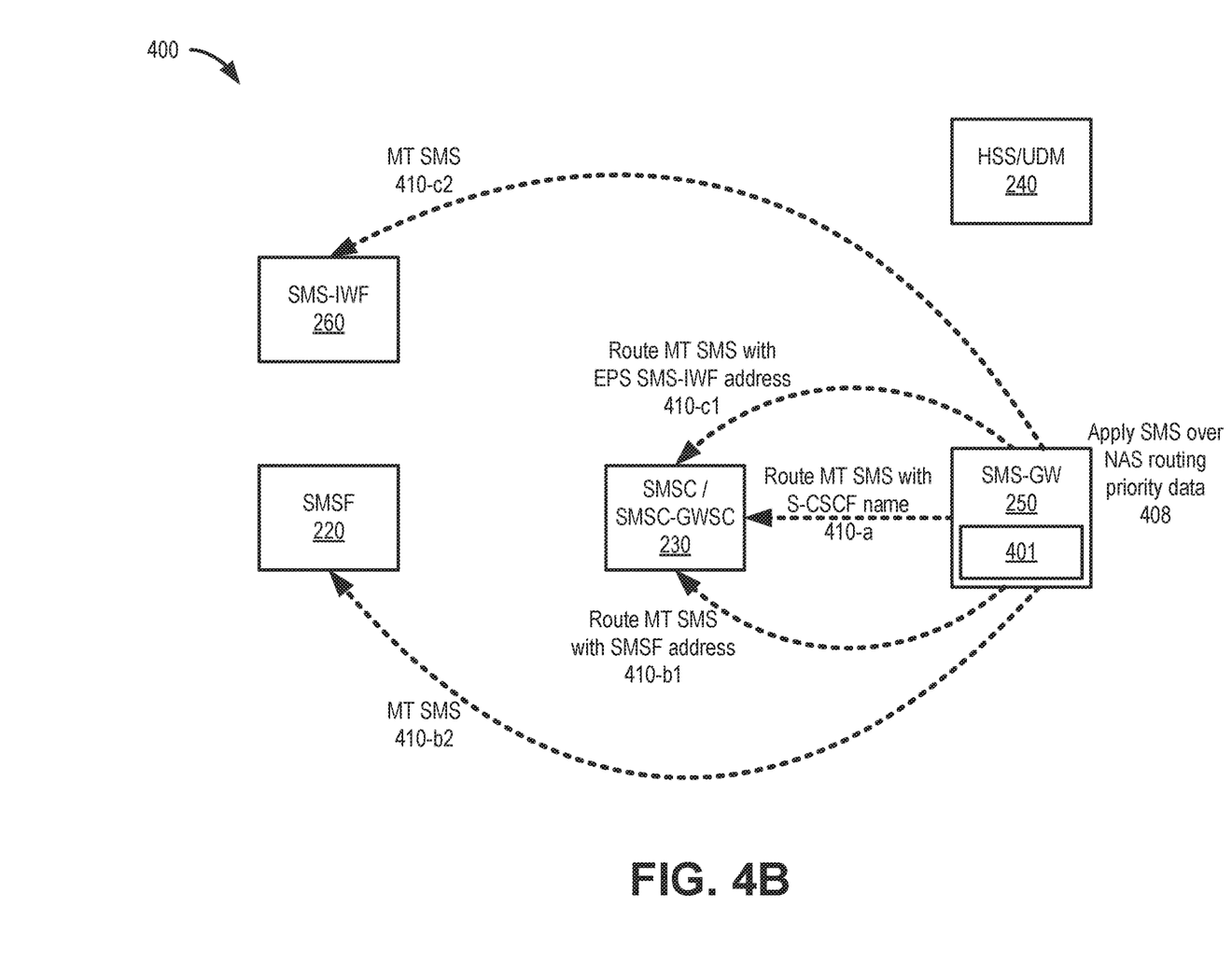

FIGS. 4A and 4B are diagrams illustrating an exemplary process of SMS routing selection in a portion 400 of network environment 100, according to an implementation. Network portion 400 may include SMSF 220, SMSC 230, HSS/UDM 240, SMS-GW 250, and SMS-IWF 260. SMS-GW 250 and HSS/UDM 240 may exchange information via a DIAMETER Sh interface 420. Particularly, the Sh interface 420 may be enhanced from a traditional Sh interface to support the exchange of an applicable SMSF address for the specific SMSF 220 associated with end device 110.

SMS-GW 250 may include stored SMS over NAS routing priority data 401 (referred to further herein as "routing priority data 401"). Routing priority data 401 may include globally-configured settings for the service provider network. Routing priority data 401 may indicate the priority among different SMS over NAS delivery methods in core networks that support both 4G and 5G network functions. Thus, routing priority data 401 may distinguish delivery preferences for IMS-based SMS delivery (e.g., "SMS over IMS"), SMS over 5G NAS delivery (e.g., "SMS over NAS via 5G SMSF"), and SMS over 4G NAS delivery (e.g., "SMS over NAS via EPS SMS-IWF"). Priorities may reflect service provider preferences for load balancing, quality-of-service, and other factors. For example, routing priority data 401 may indicate "SMS over IMS" as having the highest priority (e.g., priority 1), "SMS over NAS via 5G SMSF" as having the next highest priority (e.g., priority 2), and "SMS over NAS via EPS SMS-IWF" as having the lowest priority (e.g., priority 3). Routing priority data 401 may use different rankings in other implementations.

As shown in FIG. 4A, SMS-GW 250 may receive a MT SMS delivery request 402 from SMSC 230 for an SMS directed to end device 110. In response to MT SMS delivery request 402, SMS-GW 250 may generate a request to determine if the end device to which the MT SMS message is directed is using EPS (e.g., 4G) network functions or 5G network functions. Using information from MT SMS delivery request 402, SMS-GW 250 may query HSS/UDM 240 for data with a four-part DIAMETER Sh UDR message 404. UDR message 404 may request the following four types of data:

(1) the end device's serving call session control function (S-CSCF) name,
(2) the end device's SMS registration info with the SMSC address that is serving the end device,
(3) the end device's 5G SMSF address along with 5G serving node location information, or, alternatively, independent from the 5G serving node location, and
(4) the end device's EPS SMS-IWF address along with cell site location information, where the SMS-IWF address may be equivalent to a mobile switching center (MSC) address for the end device.

According to one implementation, UDR message 404 may be divided into multiple messages or multiple fields within one or more UDR messages 404.

HSS/UDM 240 may receive UDR message 404 and may provide a UDA 406 with as many of the four requested data types as are available for the specific end device 110. For example, if end device 110 is SIP-enabled (e.g., supporting SMS over IMS) but not connected to the 5G network, HSS/UDM 240 may use UDA message 406 to provide an identifier for the S-CSCF that handles signaling for SMS delivery via IMS network 160 (e.g., data type (1)), the SMSC address for end device 110 (e.g., data type (2)), and the SMS-IWF 260 address and cell site location information (e.g., data type (4)). In another implementation, some or all of the four types of data may be mutually exclusive, such that UDA message 406 may return only one of the four requested data types listed above. SMS-GW 250 may receive UDA message 406.

Referring to FIG. 4B, based on the information from UDA message 406, SMS-GW 250 may apply 408 routing priority data 401 to route the SMS message to end device 110 via the most preferred available route. For example, assume SMS-GW 250 may apply the routing priorities of SMS of over IMS (priority 1), SMS over NAS via 5G (priority 2), and SMS over NAS via 4G (priority 3) described above.

As a first option under the assumed priorities, if UDA message 406 provides S-CSCF name data for end device 110 (e.g., data type (1)), SMS-GW 250 will route the MT SMS to SMSC 230 along with the corresponding S-CSCF address, as indicated by message 410-*a*. Message 410-*a* will cause SMSC 230 to send the MT SMS over the IMS to end device 110's current S-CSCF with SIP protocol. In some implementations, message 410-*a* may be directed to a different SMSC 230 than the SMSC 230 that originated MT SMS delivery request 402, if the originating SMSC 230 is not currently servicing end device 110.

As a second option, if UDA message 406 provides 5G SMSF address data (e.g., data type (3)), SMS-GW 250 will route the MT SMS to end device 110's SMSC (which may or may not be the same as the SMSC 230 that originated MT SMS delivery request 402) along with end device 110's 5G SMSF address, as indicated by message 410-*b*1. Message 410-*b*1 will cause SMSC 230 to send the MT SMS to end device 110's current SMSF 220. Alternatively, as shown in message 410-*b*2 the SMS-GW 230 can use the information in UDA message 406 to route the MT SMS directly to SMSF 220.

As a third option, if UDA message 406 provides EPS SMS-IWF address data (e.g., data type (4)), the SMS-GW will route the MT SMS to end device 110's SMSC (which may or may not be the same as the SMSC 230 that originated MT SMS delivery request 402) along with end device 110's EPS SMS-IWF 260 address, as indicated by message 410-*c*1. Message 410-*c*1 will cause SMSC 230 to send the MT SMS to end device 110's 4G SMS-IWF 260. Alternatively, as shown in message 410-*c*2, the SMS-GW 230 can use the information in UDA message 406 to route the MT SMS directly to SMS-IWF 260.

While the processing sequence of FIGS. 4A and 4B reflect one set of priorities, in other implementation, routing priority data 401 may direct different priorities for MT SMS delivery.

Figure 5:
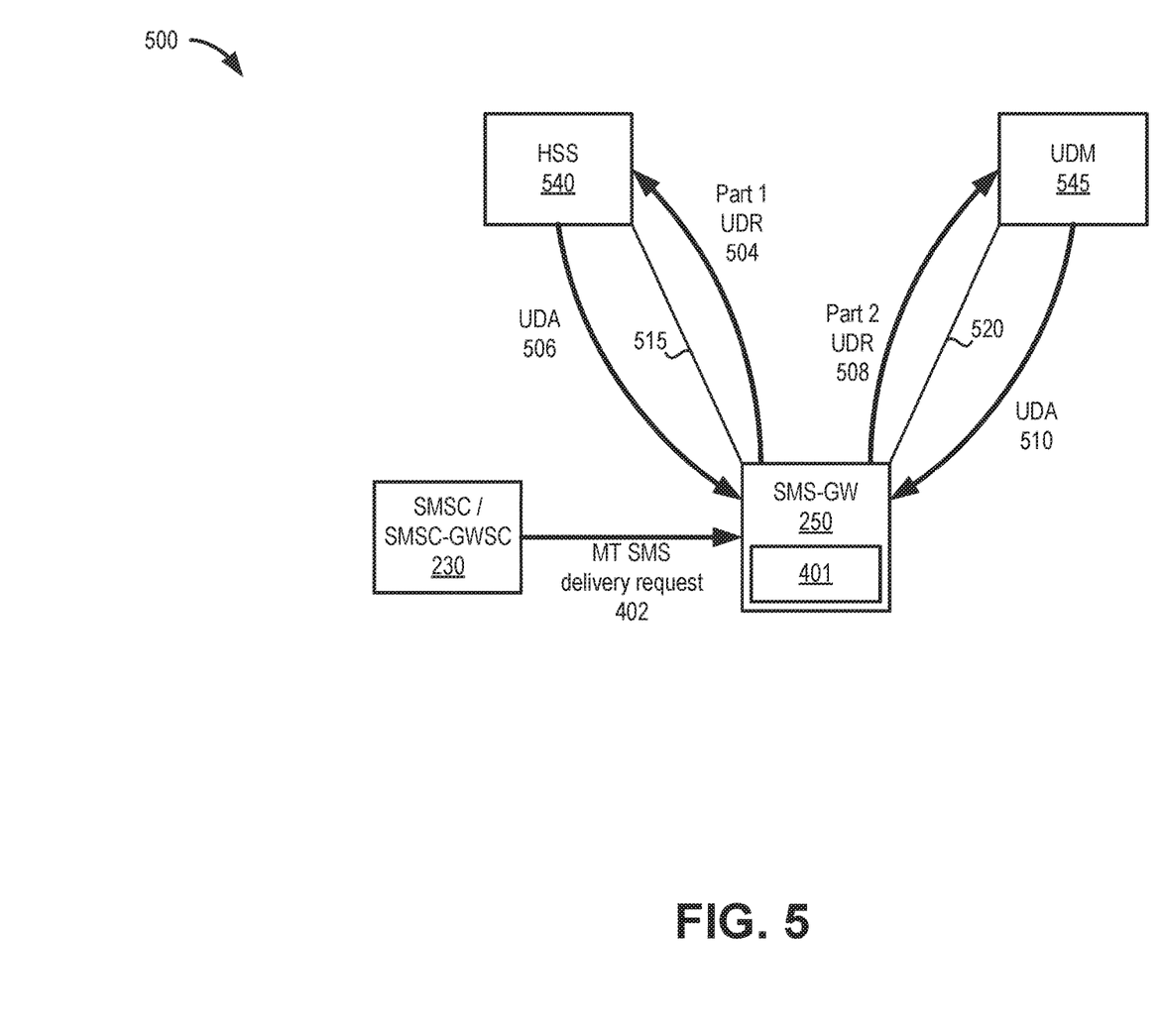
FIG. 5 is a diagram illustrating an exemplary process of SMS routing selection in another portion of the network environment of FIG. 1, according to another implementation.

FIG. 5 is a diagram illustrating an exemplary process of an embodiment of SMS routing selection in a portion 500 of network environment 100, according to another implementation. Network portion 500 may include SMSC 230, HSS 540, UDM 545, and SMS-GW 250. In the embodiment of FIG. 5, SMS-GW 250 and HSS 540 may exchange information via a DIAMETER Sh interface 515, while SMS-GW 250 and UDM 545 may exchange information via a separate enhanced DIAMETER Sh interface 520. Particularly, the Sh interface 520 may be enhanced from a traditional Sh interface 515 to support the query of an applicable SMSF address for the specific SMSF 220 associated with end device 110.

As shown in FIG. 5, SMS-GW 250 may receive a MT SMS delivery request 402 from SMSC 230 for an SMS directed to end device 110. In response to MT SMS delivery request 402, SMS-GW 250 may generate requests to determine if the end device 110 to which the MT SMS message is directed is using a 4G or 5G network. Using information from MT SMS delivery request 402, SMS-GW 250 may separately query HSS 540 and UDM 545 for data to obtain the four types of data described above in connection with UDR 404 of FIG. 4A:

SMS-GW 250 may send UDR 504 to HSS 540 to request end device 110's SMS-IWF address data (e.g., data type (4)), along with S-CSCF name data (e.g., data type (1)) and/or the SMSC address that is serving end device 110 (e.g., data type (2)). SMS-GW 250 may send UDR 508 to UDM 545 to request end device 110's SMSF address data (e.g., data type (3)), along with S-CSCF name data (e.g., data type (1)) and/or the SMSC address that is serving end device 110 (e.g., data type (2)).

HSS 540 may receive UDR message 504 and may provide a UDA message 506 with the requested data types from UDR 504 for end device 110, if available. Similarly, UDM 545 may receive UDR message 508 and may provide a UDA message 510 with the requested data types from UDR 508 for end device 110, if available. In one implementation, SMS data for end device 110 may be exclusive to either HSS 540 or UDM 545, such that only one of UDA message 506 or UDA message 510 may include the requested data. SMS-GW 250 may receive UDA message 506 and UDA message 510 and apply routing priority data 401 to route the SMS message to end device 110 via the most preferred available route, as described above in connection with FIG. 4B.

Figure 6:
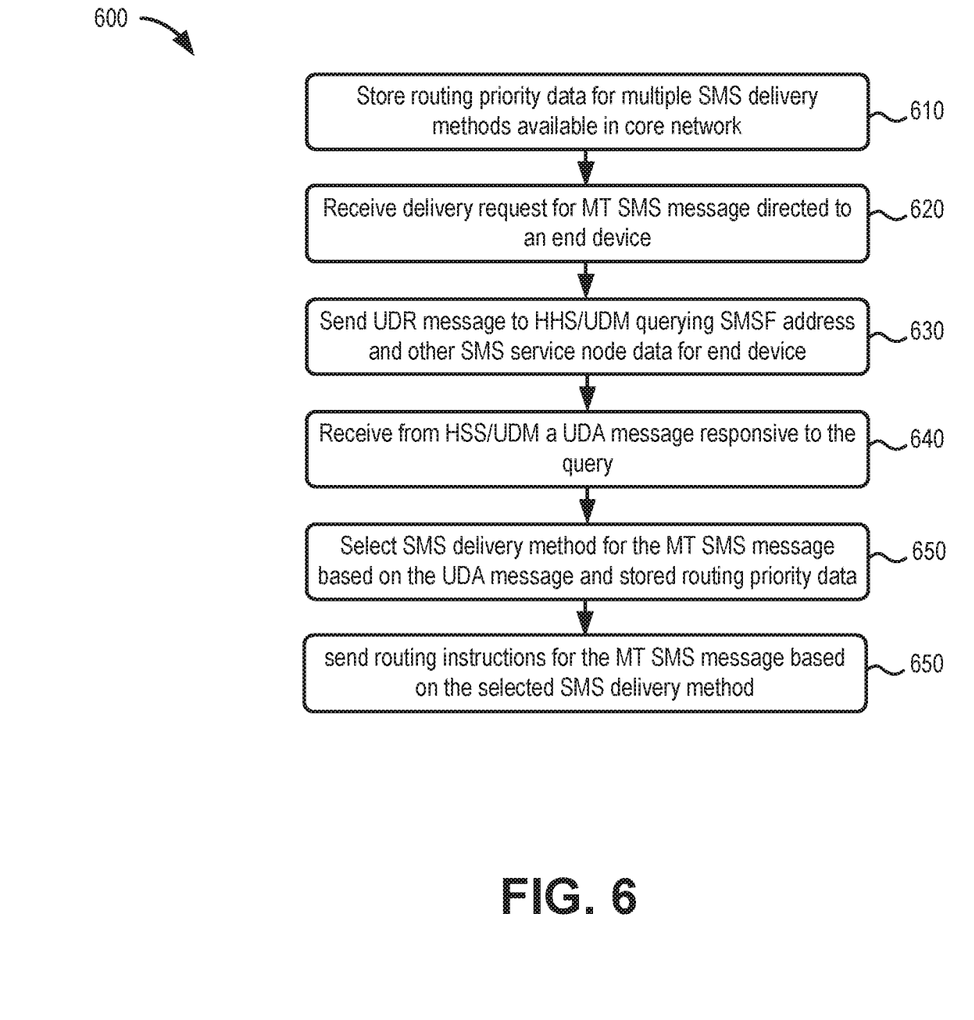
FIG. 6 is a flow diagram illustrating an exemplary process for implementing a SMS routing selection in a dual connectivity network, according to implementations described herein.

Communications shown in FIGS. 4A, 4B, and 5 provide simplified illustrations of communications in network portions 400 and 500, respectively, and are not intended to reflect every signal or communication exchanged between devices FIG. 6 is a flow diagram illustrating an exemplary process 600 for SMS routing selection in a dual connectivity network, according to an implementation described herein. In one implementation, process 600 may be implemented by SMS-GW 250. In another implementation, process 600 may be implemented by SMS-GW 250 in conjunction with one or more other network elements of network environment 100.

Referring to FIG. 6, process 600 may include storing routing priority data for multiple SMS delivery methods available in core network (block 610), and receiving a delivery request for an MT SMS message directed to an end device (block 620). For example, SMS-GW 250 may store SMS over NAS routing priority data 401 that includes settings, for the service provider network, that indicate the priority among different SMS delivery methods in core networks that support both 4G and 5G network functions. Routing priority data 401 may distinguish delivery preferences for "SMS over IMS," "SMS over NAS via 5G SMSF," and "SMS over NAS via EPS SMS-IWF." At some time after storing routing priority data 401, SMS-GW 250 may receive a MT SMS delivery request 402 from SMSC 230 for an SMS directed to end device 110.

Process 600 may also include sending a UDR message to an HHS/UDM querying an SMSF address and other SMS service node data for the end device (block 630), and receiving, from the HSS/UDM, a UDA message responsive to the query (block 640). For example, SMS-GW 250 may generate a request to determine if the end device to which the MT SMS message is directed is using EPS (e.g., 4G) network functions or 5G network functions. SMS-GW 250 may query HSS/UDM 240 for data with four-part DIAMETER Sh UDR message 404 described above. HSS/UDM 240 may receive UDR message 404 and may provide a UDA 406 with as many of the four requested data types as are available for the specific end device 110. SMS-GW 250 may receive UDA message 406.

Process 600 may further include selecting an SMS delivery method for the MT SMS message based on the UDA message and the stored routing priority data (block 650), and sending routing instructions for the MT SMS message based on the selected SMS delivery method (block 660). For example, SMS-GW 250 may apply 408 routing priority data 401 to information from UDA message 406 to route the SMS message to end device 110 via the most preferred available method. If UDA message 406 provides S-CSCF name data for end device 110, SMS-GW 250 may route the MT SMS to end device 110's SMSC 230 along with the corresponding S-CSCF address. If UDA message 406 provides 5G SMSF address data, SMS-GW 250 may route the MT SMS to end device 110's SMSC 230 along with end device 110's 5G SMSF address. If UDA message 406 provides EPS SMS-IWF address data, the SMS-GW may route the MT SMS to end device 110's SMSC along with end device 110's EPS SMS-IWF address.

Systems and methods described herein provide routing determinations for MT-SMS-over-NAS in core networks that support 5G and legacy systems. A network device stores routing priority data for multiple SMS delivery methods in the core network. The network device receives, from a first network element, a delivery request for a MT SMS message directed to an end device and sends, in response, a query to a second network element. The query requests a SMSF address for an SMSF in the core network with which the end device is registered. The network device receives a response to the query and selects, based on the response and the stored routing priority data, an SMS delivery method for the MT SMS message. The network device sends, to a third network element, routing instructions for the MT SMS message based on the selected SMS delivery method.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks and signal flows have been described with regard to the processes illustrated in FIGS. 4A. 4B, 5, and 6, the order of the signal flows and blocks may be modified according to other embodiments. Further, non-dependent signals and/or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A network device, comprising:
a communications interface configured to exchange data with network devices in a core network;
one or more memories to store instructions; and
one or more processors configured to execute the instructions to:
store, in the one or more memories, routing priority data for multiple short message service (SMS) delivery methods available through the core network, wherein the routing priority data identifies a service provider preference for when to use the multiple SMS delivery methods, the multiple SMS delivery methods including:
IP multimedia subsystem (IMS)-based SMS delivery, and
SMS over non-access stratum (NAS) delivery,
receive, from a first network element, a delivery request for a mobile-terminated (MT) SMS message directed to an end device,
send, in response to the delivery request, a query to a second network element, wherein the query requests a short message service function (SMSF) address for an SMSF in the core network with which the end device is registered,
receive, from the second network element, a response to the query, select, based on the response and based on the stored routing priority data, an SMS delivery method, of the multiple SMS delivery methods available through the core network, for the MT SMS message, and send, to a third network element, routing instructions for the MT SMS message based on the selected SMS delivery method.

2. The network device of claim 1, wherein the routing priority data indicates priority among different delivery methods available through the core network providing services based on both Evolved Packet Service (EPS) and 5G networks.

3. The network device of claim 1, wherein the query further requests an identifier for a serving call session control function (CSCF) servicing the end device, a short message service center (SMSC) address for an SMSC with which the end device is registered, or a short message service inter-working function (SMS-IWF) address associated with the end device.

4. The network device of claim 1, wherein the second network element includes a combined home subscriber server (HSS) and unified data management (UDM) function.

5. The network device of claim 1, wherein the third network element includes one of:
   a short message service center (SMSC) with which the end device is registered,
   a Short Message Service Inter-Working Function (SMS-IWF) associated with a current location of the end device, and
   the SMSF.

6. The network device of claim 1, wherein the third network element is configured to route SMS delivery via either one of an EPS core network or a 5G core network.

7. The network device of claim 1, wherein sending the query to the second network element includes sending the query via a user data request (UDR) message over a Sh interface that is modified to support the query of the SMSF address.

8. The network device of claim 1, wherein the one or more processors are further configured to execute the instructions to:
   send, in response to the delivery request, another query to a fourth network element, wherein the other query requests an identifier for a serving call session control function (CSCF) servicing the end device.

9. The network device of claim 8, wherein, when receiving the response to the query, the one or more processors are further configured to execute the instructions to:
   receive a user-data-answer (UDA) message over an Sh interface that is modified to support the query of the SMSF address.

10. The network device of claim 1, wherein the network device includes a short message service gateway (SMS-GW) function for the core network.

11. A method, comprising:
   storing, by a network device and in a memory, routing priority data for multiple short message service (SMS) delivery methods available through the core network, wherein the routing priority data identifies a service provider preference for when to use the multiple SMS delivery methods, the multiple SMS delivery methods including:
      IP multimedia subsystem (IMS)-based SMS delivery, and
      SMS over non-access stratum (NAS) delivery;

receiving, by the network device and from a first network element, a delivery request for a mobile-terminated (MT) SMS message directed to an end device;

send, by the network device and in response to the delivery request, a query to a second network element, wherein the query requests a short message service function (SMSF) address for an SMSF in the core network with which the end device is registered;

receive, by the network device and from the second network element, a response to the query;

select, by the network device and based on the response and based on the stored routing priority data, an SMS delivery method, of the multiple SMS delivery methods available through the core network, for the MT SMS message; and send, by the network device and to a third network element, routing instructions for the MT SMS message based on the selected SMS delivery method.

12. The method of claim 11, wherein the routing priority data indicates priority among different delivery methods available through the core network, wherein the core network provides services via both Evolved Packet Service (EPS) and 5G network functions.

13. The method of claim 11, wherein sending the query further comprises requesting:
   an identifier for a serving call session control function (CSCF) servicing the end device,
   a short message service center (SMSC) address for an SMSC with which the end device is registered, and
   a short message service inter-working function (SMS-IWF) address associated with the end device.

14. The method of claim 11, wherein the second network element includes:
   a combined home subscriber server (HSS) and unified data management (UDM) function; or
   a UDM function.

15. The method of claim 11, wherein sending the query to the second network element includes sending the query via a user data request (UDR) message over a modified Sh interface.

16. The method of claim 11, wherein sending the routing instructions further comprises:
   sending, to a short message service center (SMSC) with which the end device is registered, one or more of a serving call session control function (CSCF) name, the SMSF address, or a short message service inter-working function (SMS-IWF) address.

17. A non-transitory computer-readable medium, storing instructions executable by one or more processors, the non-transitory computer-readable medium comprising one or more instructions to:
   store, in one or more memories, routing priority data for multiple short message service (SMS) delivery methods available through the core network, wherein the routing priority data identifies a service provider preference for when to use the multiple SMS delivery methods, the multiple SMS delivery methods including:
      IP multimedia subsystem (IMS)-based SMS delivery, and
      SMS over non-access stratum (NAS) delivery;
   receive, from a first network element, a delivery request for a mobile-terminated (MT) SMS message directed to an end device;
   send, in response to the delivery request, a query to a second network element, wherein the query requests a short message service function (SMSF) address for an SMSF in the core network with which the end device is registered;
receive, from the second network element, a response to the query;
select, based on the response and based on the stored routing priority data, an SMS delivery method, of the multiple SMS delivery methods available through the core network, for the MT SMS message; and
send, to a third network element, routing instructions for the MT SMS message based on the selected SMS delivery method.

18. The non-transitory computer-readable medium of claim 17, wherein the one or more instructions to send the query to the second network element further include instructions to:
send the query to a combined home subscriber server (HSS) and unified data management (UDM) function via a user data request (UDR) message over an Sh interface.

19. The non-transitory computer-readable medium of claim 18, wherein the one or more instructions to send the query to the second network element further include instructions to:
request an identifier for a serving call session control function (CSCF) servicing the end device, and
request a short message service inter-working function (SMS-IWF) address associated with the end device.

20. The non-transitory computer-readable medium of claim 17, wherein the one or more instructions to send the query to the second network element further include instructions to:
send separate queries to a home subscriber server (HSS) and a unified data management (UDM) function via different user data request (UDR) messages.

* * * * *